United States Patent

Bühler et al.

[11] Patent Number: 5,160,495
[45] Date of Patent: Nov. 3, 1992

[54] 2-CYANO-4,6-DIMITRO-PHENYL MONOAZO DYESTUFFS

[75] Inventors: Ulrich Bühler, Alzenau; Reinhard Kühn, Frankfurt; Margareta Boos, Hattersheim, all of Fed. Rep. of Germany

[73] Assignee: Cassella Aktiengesellschaft, Frankfurt am Main, Fed. Rep. of Germany

[21] Appl. No.: 605,148

[22] Filed: Oct. 29, 1990

Related U.S. Application Data

[63] Continuation of Ser. No. 438,316, Nov. 20, 1989, abandoned.

[30] Foreign Application Priority Data

Nov. 28, 1988 [DE] Fed. Rep. of Germany ....... 3840065

[51] Int. Cl.$^5$ .................. C09B 29/085; C09B 67/22; D06P 1/18
[52] U.S. Cl. .................. 534/854; 534/581; 534/595; 534/597; 534/573
[58] Field of Search .................. 534/597, 854, 595

[56] References Cited

U.S. PATENT DOCUMENTS

| | | |
|---|---|---|
| 3,122,410 | 2/1964 | Mueller et al. ............ 534/854 X |
| 3,407,189 | 10/1968 | Merian .................. 534/854 |
| 3,413,075 | 11/1968 | Rotcop et al. ............ 8/639 |
| 3,522,234 | 7/1970 | Groebke ................ 534/854 |
| 3,962,209 | 6/1976 | Gotteschlich et al. ...... 534/852 X |
| 4,126,610 | 11/1978 | Belfort ................. 534/852 X |
| 4,348,319 | 9/1982 | Hamprecht .............. 534/854 X |
| 4,802,889 | 2/1989 | Buhler et al. ........... 534/854 X |

FOREIGN PATENT DOCUMENTS

| | | |
|---|---|---|
| 0216339 | 4/1987 | European Pat. Off. . |
| 1419879 | 4/1969 | Fed. Rep. of Germany . |
| 2950588 | 6/1981 | Fed. Rep. of Germany ...... 534/854 |
| 3533980 | 3/1987 | Fed. Rep. of Germany ...... 534/854 |
| 1515551 | 1/1968 | France . |
| 1598799 | 9/1981 | United Kingdom ........... 534/854 |

Primary Examiner—Robert W. Ramsuer
Assistant Examiner—Fiona T. Powers
Attorney, Agent, or Firm—Connolly and Hutz

[57] ABSTRACT

Monoazo dyestuffs useful for dyeing and printing hydrophobic fibers have the formula

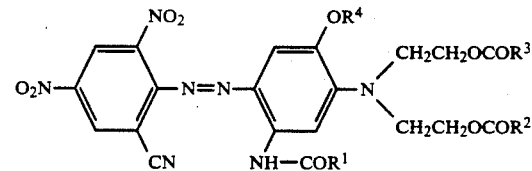

in which $R^1$ denotes alkyl having 1 to 3 carbon atoms, $R^2$ and $R^3$ independently of one another denote alkyl having 2 to 5 carbon atoms and $R^4$ denotes methyl or ethyl.

10 Claims, No Drawings

2-CYANO-4,6-DIMITRO-PHENYL MONOAZO DYESTUFFS

This application is a continuation of application Ser. No. 07/438,316 filed Nov. 20, 1989 now abandoned.

The present invention relates to useful monoazo dyestuffs of the general formula I

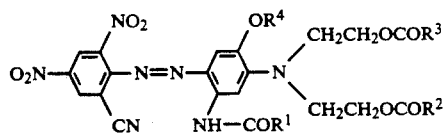

in which $R^1$ denotes alkyl having 1 to 3 C atoms, $R^2$ and $R^3$ independently of one another denote alkyl having 2 to 5 C atoms and $R^4$ denotes methyl or ethyl.

The invention also relates to mixes of dyestuffs of the general formula I and to the preparation of these dyestuffs and their mixtures and their use for dyeing hydrophobic fibre materials.

The alkyl radical $R^1$ having 1 to 3 C atoms can denote methyl, ethyl, n-propyl or i-propyl. Preferred radicals for $R^1$ are methyl and ethyl.

The alkyl radicals $R^2$ and/or $R^3$ can be straight-chain or branched. Examples of the alkyl radicals $R^2$ and/or $R^3$ having 2 to 5 C atoms are: ethyl, n-propyl, i-propyl, n-butyl, i-butyl, tert.-butyl, sec.-butyl, n-pentyl, pent-2-yl and pent-3-yl.

The alkyl radicals $R^2$ and/or $R^3$ preferably have 2 to 4 C atoms. Preferred radicals for $R^2$ and/or $R^3$ are ethyl, and in particular n-propyl, i-propyl, n-butyl, i-butyl and sec.-butyl. $R^4$ preferably represents methyl. The radicals $R^2$ and $R^3$ are preferably identical.

The sum of the C atoms in the radicals $R^1$, $R^2$ and $R^3$ is preferably 5 to 11, particularly preferably 6 to 10. Preferred combinations for $R^1$, $R^2$ and $R^3$ are $CH_3/C_2H_5/C_2H_5$; $CH_3$/n-pentyl/n-pentyl; $CH_3$/pent-2-yl/pent-2-yl; and $CH_3$/pent-3-yl/pent-3-yl.

Particularly preferred combinations for $R^1$, $R^2$ and $R^3$ are $CH_3$/n-butyl/n-butyl; $CH_3$/i-butyl/i-butyl; $CH_3$/sec.-butyl/sec.-butyl; $C_2H_5$/n-propyl/n-propyl; $C_2H_5$/i-propyl/i-propyl.

Especially preferred combinations for $R^1$, $R^2$ and $R^3$ are $CH_3$/n-propyl/n-propyl; $CH_3$/i-propyl/i-propyl; $C_2H_5/C_2H_5/C_2H_5$.

Preferred dyestuffs of the formula I are those with preferred radicals $R^1$, $R^2$ and $R^3$.

Particularly preferred dyestuffs are those with particularly preferred combinations of $R^1$, $R^2$ and $R^3$ and where $R^4$ is methyl.

Especially preferred dyestuffs are those with especially preferred combinations of $R^1$, $R^2$ and $R^3$ and where $R^4$ is methyl.

The dyestuffs of the formulae II and III

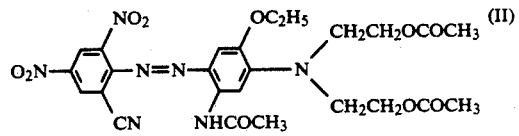

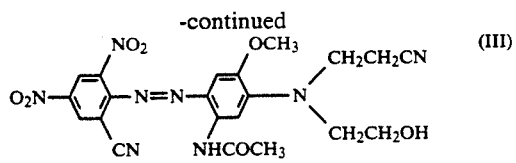

which are similar to the dyestuffs according to the invention are already known and are described in German Patent 1,544,563.

However, it has now been found, surprisingly, that the dyestuffs according to the invention are superior to these dyestuffs, especially in application fastness properties, such as pH sensitivity, reduction sensitivity and fastness to prolonged boiling, as well as in tinctorial strength, and have very good fastness properties in use, such as fastness to thermomigration, fastness to thermofixing, fastness to water and fastness to light. They can moreover also be employed in alkaline discharge resist printing.

The dyestuffs according to the invention have a greenish-tinged blue shade and they are therefore outstandingly suitable for toning reddish-tinged blue dyestuffs, for example those of the formula IV

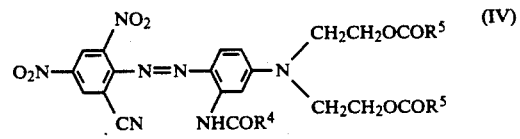

such as are described, for $R^4=R^5=CH_3$, for example, in British Patent Specification 1,184,825, to give neutral blue shades.

The dyestuffs according to the invention are preferably prepared by a procedure in which an azo dyestuff of the formula V

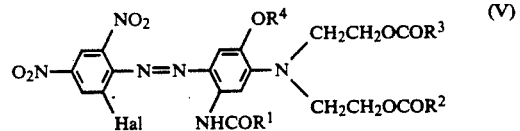

wherein $R^1$, $R^2$, $R^3$ and $R^4$ have the meanings already given and Hal denotes a halogen atom, such as chlorine or, in particular, bromine, is subjected to a nucleophilic replacement reaction in a manner which is known per se, for example in accordance with the instructions in German Offenlegungsschrift 1,809,920, German Offenlegungsschrift 1,809,921, British Patent Specification 1,184,825, German Auslegeschrift 1,544,563, German Offenlegungsschrift 2,310,745, German Auslegeschrift 2,456,495, German Auslegeschrift 2,610,675, German Offenlegungsschrift 2,724,116, German Offenlegungsschrift 2,724,117, German Offenlegungsschrift 2,834,137, German Offenlegungsschrift 2,341,109, U.S. Pat. No. 3,821,195, German Offenlegungsschrift 2,715,034 or German Offenlegungsschrift 2,134,896, the cyanide ion $CN^-$ being employed as a nucleophilic agent. In this reaction, Hal in the dyestuff of the formula V is replaced by CN.

Solvents which are employed for the replacement reaction are inert organic solvents, such as, for example, nitrobenzene or glycol or diglycol monomethyl or monoethyl ether, or mixtures of such solvents with one another and with tertiary organic nitrogen bases, and dipolar aprotic solvents, such as, for example, N-methylpyrrolidone, pyridine, dimethylformamide, dimethylsulphoxide or dicyano-dialkylthio ethers. Water or aqueous systems consisting of water and a water-immiscible organic solvent, such as, for example, nitrobenzene, preferably in the presence of a wetting or dispersing agent or a known phase transfer catalyst, or of water and a water-soluble inert organic solvent, such as ethylene glycol or dimethylformamide, are furthermore suitable as the medium for the replacement reaction.

The presence of organic basic nitrogen compounds, such as, for example, pyridine and pyridine bases, also have a favourable effect on the replacement reaction.

The reaction temperatures for the replacement reaction are normally between 20° and 150° C.

The nucleophilic agent $CN^-$ is fed to the reaction in the form of a metal cyanide, which is complex if appropriate, such as, for example, an alkali metal or alkaline earth metal cyanide, zinc cyanide or an alkali metal cyano-zincate or ferrate, but preferably in the form of copper-I cyanide or a system which forms copper-I cyanide. The use of a combination of alkali metal cyanide and copper-I cyanide, in which the weight ratio of alkali metal and copper salt can be varied within wide limits, has proved particularly suitable.

The customary range for the weight ratio of alkali metal cyanides/copper-I cyanide is 5:95 to 95:5. Positive mutual influencing of the components can also still be detected outside these limits. It is of course also possible for the copper-I cyanide in turn to be replaced by a system which forms copper-I cyanide, such as, for example, a combination of alkali metal cyanide with another copper salt, preferably a copper-I salt, such as, for example, a copper-I halide.

The dyestuffs of the formula V required for preparation of the dyestuffs according to the invention can be prepared by a procedure in which a diazonium compound of an aromatic amine of the general formula VI

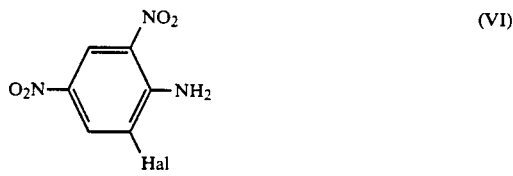

wherein Hal has the meaning already given, is coupled with a coupling component of the general formula VII

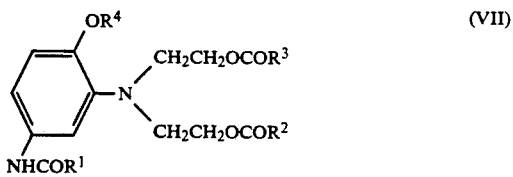

wherein $R^1$, $R^2$, $R^3$ and $R^4$ have the abovementioned meanings, in a manner which is known per se.

The solutions of the diazonium compounds are obtained from the amines of the general formula VI in a manner which is known per se by the action of nitrous acid or other systems which form nitrozonium ions, in a mineral acid or a mineral acid aqueous medium or a lower alkane carboxylic acid, such as, for example, formic acid, acetic acid or propionic acid, or mixtures thereof, at temperatures from $-15°$ C. to 40° C.

The coupling is likewise carried out in a manner which is known per se by combining the resulting solution of the diazonium compound with a solution of the coupling component at temperatures from 0° to 40° C., preferably 0° to 25° C., in a suitable solvent, such as, for example, an alkanol having 1 to 4 C atoms or dimethylformamide, or preferably in water acidified with sulphuric acid, hydrochloric acid or phosphoric acid, or an optionally aqueous lower alkane carboxylic acid or a lower alkane carboxylic acid mixture.

In some cases, it may be advantageous to buffer the pH during the coupling, for example by addition of sodium acetate. The coupling has ended after a few hours and the dyestuff of the formula V can be isolated and dried in the customary manner.

The coupling components of the formula VII required can be prepared from known commercial products by known processes.

Another process for the preparation of the dyestuffs according to the invention comprises acylation of dyestuffs of the formula VIII

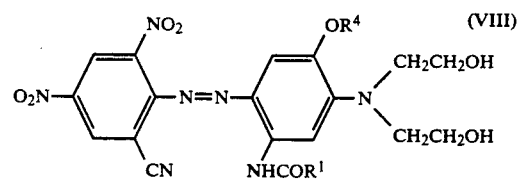

wherein $R^1$ and $R^4$ have the meanings given, with known acylating agents of the formula $X-COR^2$ or $X-COR^3$ wherein X is a radical which can be split off, taking the bonding electron pair and $R^2$ and $R^3$ have the abovementioned meanings. The acylating agents are reacted derivatives of the carboxylic acids of the formulae $R^2COOH$ or $R^3COOH$ such as, for example, carboxylic acid chlorides (X=Cl) or carboxylic acid anhydrides ($X=R^2COO-$ or $X=R^3COO-$).

It is advantageous to carry out the acylation reaction in a solvent or diluent in order to moderate the reaction. All the organic solvents which cannot react with the acylating agents are suitable. Aromatic hydrocarbons, such as benzene, toluene or xylene, are chiefly used as solvents, diluents or dispersing agents, it being advantageous to carry out the acylation in the presence of an acid-trapping agent, such as, for example, a tertiary organic amine base. Acylations of the type mentioned can also be carried out in the presence of pyridine or pyridine derivatives as solvents. In this case, the solvent itself acts as the acid-trapping agent. Acylation with alkane carboxylic acid anhydrides is possibly carried out in the excess alkane carboxylic acid anhydride itself or in the corresponding alkane carboxylic acid as the solvent. The acylation of the dyestuffs of the formula VIII can be carried out at temperatures between normal room temperature and temperatures up to 150° C. At least 2 mol of the acylating agent are as a rule employed per mol of the dyestuff of the formula VIII.

The dyestuffs of the formula VIII required for this preparation process can be prepared by a process in which a diazonium compound of an aromatic amine of the general formula VI

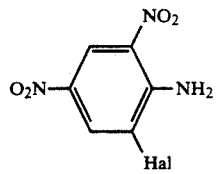

is coupled with a coupling component of the general formula IX

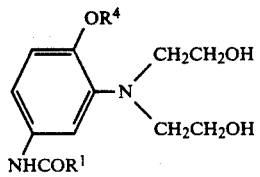

wherein Hal, $R^1$ and $R^4$ have the abovementioned meanings, in a manner which is known per se and the halogen atom Hal is then replaced by the cyano radical.

The diazotization of the aromatic amine of the formula VI and the coupling of the resulting diazonium compounds to the amine of the formula IX are carried out within the conditions which have already been described in detail above for the preparation of the dyestuffs of the formula V. The subsequent replacement of the halogen atom Hal by cyano is also carried out within the conditions described above for the preparation of the dyestuffs of the formula I according to the invention.

Dyestuff mixtures according to the invention consist of two or more dyestuffs of the formula I in which $R^1$, $R^2$, $R^3$ and $R^4$ have the abovementioned meanings Mixtures of preferred dyestuffs of the formula I are preferred, and of these those which differ only in the meaning of the radical $R^1$ are particularly preferred.

The ratio of the various dyestuffs of the general formula I in the dyestuff mixtures according to the invention can vary within relatively wide limits, and the dyestuffs can be in the form of crystal mixtures or entirely or partly in the form of mixed crystals. The minimum amount by weight of one component is in general 10%, and its maximum amount by weight is 90%. In the case of dyestuff mixtures which consist only of two dyestuffs of the general formula I, a weight ratio of 70:30 to 30:70 is preferred, that is to say the amount by weight of one dyestuff is 30 to 70%.

The dyestuff mixtures according to the invention can be prepared by various processes, thus, for example:

1) By mixing at least two separately prepared and finished individual dyestuffs of the formula I.

2) By mixing separately prepared individual dyestuffs which have not been finished and finishing them together.

3) By mixing the starting materials of the general formulae V; VI and VII; VIII; or VI and IX, and further reacting them together as described above.

If, for example, a mixture of two or more dyestuffs of the formula V which differ from one another in respect of $R^1$ and/or $R^2$ and/or $R^3$ and/or $R^4$ is employed instead of an individual dyestuff of the formula V in the process described above for replacement by cyano, the corresponding mixture of dyestuffs of the formula I according to the invention is obtained.

The mixture of the dyestuffs of the formula V which is employed here can of course in turn either be obtained by mixing separately prepared dyestuffs of the formula V, or it can be prepared by coupling of the diazonium compound of an amine of the formula VI to a corresponding mixture of coupling components of the formula VII which differ from one another in respect of $R^1$ and/or $R^2$ and/or $R^3$ and/or $R^4$.

It is also possible in the acylation process described above for a mixture of two or more dyestuffs of the formula VIII which differ from one another in respect of $R^1$ and/or $R^4$ to be acylated instead of an individual starting dyestuff of the formula VIII. Another variant of this process is the acylation of a dyestuff or a mixture of two or more dyestuffs of the formula VIII which differ in respect of $R^1$ and/or $R^4$ with a mixture of two or more acylating agents which differ from one another in respect of $R^2$ and $R^3$.

The dyestuffs and dyestuff mixtures according to the invention are outstandingly suitable, individually or as a mixture with other dispersed dyestuffs, for dyeing and printing hydrophobic synthetic materials. Possible hydrophobic synthetic materials are, for example: cellulose 2½ acetate, cellulose triacetate, polyamides and high molecular weight polyesters. The dyestuffs according to the invention are preferably employed for dyeing and printing materials of high molecular weight polyesters, in particular those based on polyethylene glycol terephthalates or mixtures thereof with naturally occurring fibre materials, or of materials of cellulose triacetate.

The hydrophobic synthetic materials can be in the form of sheet-like or thread-like structures and can be processed, for example, to yarns or woven, knitted or meshed textiles. The fibre goods mentioned can be dyed with the dyestuffs or dyestuff mixtures according to the invention in a manner which is known per se, preferably from aqueous suspension, if appropriate in the presence of carriers, at between 80° and about 110° C. by the exhaustion process or by the HT process in a dyeing autoclave at 110° to 140° C., and by the so-called thermofixing process, in which the goods are padded with the dye liquor and then fixed at about 80° to 230° C. Printing of the materials mentioned can be carried out in a manner which is known per se by incorporating the dyestuffs or dyestuff mixtures according to the invention into a printing paste and treating the goods printed with this paste with HT steam, pressurized steam or dry heat at temperatures between 80° to 230° C., if appropriate in the presence of a carrier, in order to fix the dyestuff. Very deep greenish-tinged blue dyeings and prints with very good fastness properties, in particular very good fastness to light, thermofixing, thermomigration and washing, and above all a very good M+S fastness (C4A washing), are obtained in this manner.

The dyestuffs or dyestuff mixtures according to the invention are also suitable for dyeing the abovementioned hydrophobic materials from organic solvents by the methods known for this, and for bulk dyeing as well as for alkaline discharge resist printing.

If a textile material containing exclusively hydrophobic fibres or only the hydrophobic fibre content of a textile blend is to be coloured by alkaline discharge resist printing, the procedure takes place in a manner which is known per se by padding the textile materials with dye liquors or printing them with printing pastes which contain one or more dyestuffs of the formula I in addition to the known customary dyeing auxiliaries, such as, for example, dispersing agents, wetting agents, foam suppressants or padding auxiliaries and printing thickeners. Padded fabric webs are squeezed off onto a liquor pick-up of 50 to 120%. After this first padding or printing process, the goods can be dried or superficially dried, or further processing can be carried out "wet-in-wet" without any separate drying operation. The fabric webs are then printed with a discharge resist printing paste which contains, as the discharge agent, a base which produces a pH of at least 8 in 5% strength aqueous solution, and the known additives customary in printing pastes for textile printing, in particular thickening agents.

The operation, mentioned above as the first process step, of padding or printing with a dye liquor or printing paste and the printing, mentioned as the second step, with the discharge resist printing paste can also be interchanged. In this case, after the discharge resist printing paste has been printed on, the textile material is overpadded with the dye liquor for the background dyeing, or overprinted with the printing paste. This sequence can also be carried out "wet-in-wet", or the textile material can be dried superficially or dried after being printed with the discharge resist paste. The padded and printed fabric webs are then subjected to heat treatment at between 100° and 230° C. In the lower temperature range from about 100° to 110° C., heating is preferably by superheated steam. For heat treatments carried out between 160° and 230° C., hot air is preferably used as the heat transfer medium. After the heat treatment, which results in fixing of the dispersed dyestuffs and destruction of the dyestuffs of the formula I at the points printed with the discharge resist printing paste, the textiles are after-treated, rinsed hot and cold and dried, in the manner customary for polyesters. A particular embodiment of the discharge printing process comprises a procedure in which the padding liquor also contains, in addition to dyestuffs of the formula I, those which are stable towards alkali and thus are not destroyed by the alkaline discharge resist printing pastes to be employed. If the procedure is otherwise as described above, multi-coloured designs are obtained. As already described above, another embodiment of the process comprises a procedure in which the dye liquor of the formula I is not applied to the total fabric by padding with a padding liquor but is likewise printed on to the fabric in the form of printing pastes.

Fixing and finishing of the textile prints is then carried out as already described above. It is also possible in this process to add dyestuffs which are resistant to alkalis to the printing pastes printed on. In this case also, multi-coloured designs are obtained.

A large number of bases which the discharge resist printing paste contains as discharge agents and which bring about a pH of at least 8 in 5% strength aqueous solution are known. Examples of such bases are the hydroxides of the alkali and alkaline earth metals, salts of alkaline earth and alkali metals with weak organic or inorganic acids, such as, for example, alkali metal acetates, alkali metal carbonates or bicarbonates or trialkali metal phosphates, ammonia or aliphatic amines, such as, for example, triethyl-, tripropyl- or tributyl-amine, ethanolamine, dimethyl- or diethyl ethanolamine, diethanolamine, methyl-, ethyl- or propyldiethanolamine or triethanolamine. Alkaline earth metal hydroxides, such as, for example, calcium hydroxide, alkali metal hydroxides, such as, for example, sodium hydroxide or potassium hydroxide, or alkali metal salts of weak inorganic acids, such as, for example, sodium carbonate, trisodium phosphate or sodium silicate or potassium silicate, are usually employed as the bases. Sodium hydroxide or potassium hydroxide or, in particular, sodium carbonate, potassium carbonate, sodium bicarbonate or potassium bicarbonate is preferably used as the base in the discharge resist printing pastes. Mixtures of various bases can also be used. The concentration of the base in the discharge resist printing pastes is advantageously 25 to 250 g/kg, preferably 50 to 130 g/kg. The discharge resist printing pastes contain, in addition to the bases mentioned, the additives usually contained in textile printing pastes, in particular thickening agents, such as, for example, alginates, starch products, synthetic polymeric thickening agents, mineral oils, hydrotropic substances, such as, for example, urea, and additives which promote the wetting, penetration and dyestuff uptake. The presence of nonionogenic detergents, which are advantageously contained in the discharge resist printing pastes, such as, for example, glycerol and/or polyglycols, such as polyethylene glycol having an average molecular weight of 300 to 400, is particularly advantageous for the discharge operation.

The dyestuffs or dyestuff mixtures according to the invention should be present in the dye liquors and printing pastes employed in the above application in the finest possible division.

The dyestuffs are finely divided in a manner which is known per se by suspending the dyestuff obtained in the manufacture in a liquid medium, preferably in water, together with dispersing agents and exposing the mixture to the action of shearing forces, the dyestuff particles originally present being ground mechanically to the extent that an optimum specific surface area is achieved and the sedimentation of the dyestuff is as low as possible. The particle sizes of the dyestuffs are in general between 0.5 and 5 $\mu$m, preferably about 1 $\mu$m.

The dispersing agents also to be employed in the grinding operation can be nonionogenic or anionic. Nonionogenic dispersing agents are, for example, reaction products of alkylene oxides, such as, for example, ethylene oxide or propylene oxide, with compounds which can be alkylated, such as, for example, fatty alcohols, fatty amines, fatty acids, phenols, alkylphenols and carboxylic acid amides. Examples of anionic dispersing agents are lignin-sulphonates, alkyl- or alkylaryl sulphonates or alkyl-arylpolyglycol-ether sulphates.

The dyestuff formulations thus obtained should be pourable for most methods of use. The dyestuff and dispersing agent content is therefore limited in these cases. The dispersions are in general brought to a dyestuff content of up to 50% by weight and a dispersing agent content of up to about 25%. For economic reasons, the dyestuff contents usually do not fall below 15% by weight.

The dispersions can also additionally contain other auxiliaries, for example those which act as oxidizing agents, such as, for example, sodium m-nitrobenzene sulphonate, or fungicidal agents, such as, for example sodium o-phenyl-phenolate and sodium pentachlorophenolate, and in particular so-called "acid donors", such as, for example, butyrol acetone, monochloroacetamide, sodium chloroacetate, sodium dichloroacetate, the Na salt of 3-chloropropionic acid, half-esters of sulphuric acid, such as, for example, lauryl sulphate, and sulphuric acid esters of oxyethylated and oxypropylated alcohols, such as, for example, butyl glycol sulphate.

The dyestuff dispersions thus obtained can very advantageously be used for preparing printing pastes and dye liquors. They offer particular advantages, for example, in the case of continuous processes in which the dyestuff concentration of the dye liquors must be kept constant by continuously feeding dyestuff into the running apparatus.

For certain fields of use, powder formulations are preferred. These powders contain the dyestuff or the dyestuff mixture, dispersing agents and other auxiliaries, such as, for example, wetting agents, oxidizing agents, preservatives and dust removal agents, and the above-mentioned "acid donors".

A preferred preparation process for pulverulent dyestuff formulations comprises removing the liquid from the liquid dyestuff dispersions described above, for example by vacuum drying, freeze drying or drying on roller dryers, but preferably by spray drying.

To prepare the dye liquors, the required amounts of the dyestuff formulations, which have been prepared in accordance with the above instructions, are diluted with the dyeing medium, preferably with water, to the extent that a liquor ratio of 1:5 to 1:50 results for the dyeing. Other dyeing auxiliaries, such as dispersing, wetting and fixing auxiliaries, are in general additionally added to the liquors. A pH of 4 to 5, preferably of 4.5, is established by addition of organic and inorganic acids, such as acetic acid, succinic acid, boric acid or phosphoric acid.

If the dyestuff or dyestuff mixture is to be used for textile printing, the required amounts of the dyestuff formulations are kneaded to printing pastes in a manner which is known per se, together with thickeners, such as, for example, alkali metal alginates or the like, and if appropriate other additives, such as, for example, fixing accelerators, wetting agents and oxidizing agents.

The invention is illustrated in more detail by the following examples. Percentage data are percentages by weight.

EXAMPLE 1

68.1 g of the dyestuff of the formula X

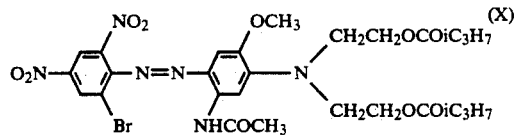

are introduced into a suspension of 100 ml of dimethyl sulphoxide, 2.1 g of sodium cyanide and 7.1 of copper-I cyanide at 70° to 75° C. and the mixture is stirred at this temperature for 30 minutes. The temperature is then raised to 110° C. for 30 minutes and the vat is subsequently stirred slowly until cold and filtered off with suction and the residue is washed with 45 ml of dimethyl sulphoxide, 7.5% strength aqueous ammonia solution and water and dried under reduced pressure. 47.0 g of a greenish-tinged blue dyestuff of the formula XI

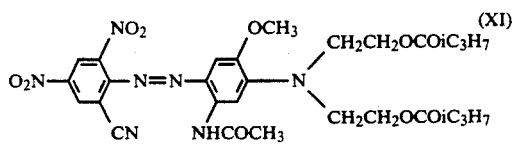

which has its absorption maximum at 636 nm, are thus obtained.

A dyestuff preparation which is ready for use in dyeing is obtained by a finishing process, which is customary in practice, of aqueous grinding in a bead mill using a dispersing agent, which is customary in practice, based on lignin-sulphonate and subsequent spray drying.

b) 1.2 g of the dyestuff preparation thus obtained are dispersed in 2000 g of water. 3.6 ml of 85% strength phosphoric acid are added to the dispersion, a pH of 4 is established with sodium hydroxide solution and 2 g of a commercially available dispersing agent based on a naphthalene sulphonic acid-formaldehyde condensate are added. 100 g of a polyester fabric based on polyethylene glycol terephthalate are introduced into the dye liquor thus obtained and dyeing is carried out at 130° C. for 30 minutes. After subsequent rinsing, reductive after-treatment with a 0.2% strength aqueous sodium dithionite solution at 70° to 80° C. for minutes, rinsing and drying, a deep greenish-tinged blue dyeing with very good coloristic properties, in particular very good fastness to thermofixing, thermomigration and washing, is obtained.

EXAMPLE 2

If 66.7 g of the dyestuff of the formula XII

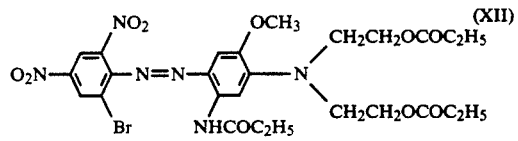

are subjected to cyanide replacement as described in Example 1, 47.4 g of the greenish-tinged blue dyestuff of the formula XIII

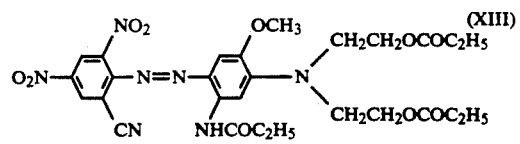

which has its absorption maximum at 634 nm, are obtained.

The dyestuffs according to the invention of the following Table can be prepared analogously to Examples 1 and 2. They likewise dye hydrophobic fibres in full greenish-tinged blue shades with excellent fastness properties.

TABLE

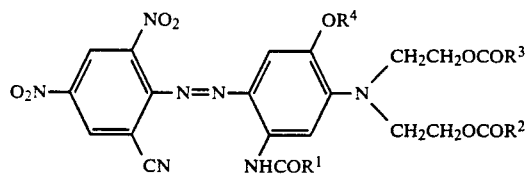

| R¹ | R² | R³ | R⁴ |
|---|---|---|---|
| CH₃ | C₂H₅ | C₂H₅ | CH₃ |
| CH₃ | C₂H₅ | n-C₃H₇ | CH₃ |
| CH₃ | C₂H₅ | i-C₃H₇ | CH₃ |
| CH₃ | C₂H₅ | sec.C₄H₉ | CH₃ |
| CH₃ | C₂H₅ | n-C₄H₉ | CH₃ |
| CH₃ | C₂H₅ | C₅H₁₁-2 | CH₃ |
| CH₃ | n-C₃H₇ | n-C₃H₇ | CH₃ |
| CH₃ | n-C₃H₇ | i-C₃H₇ | CH₃ |
| CH₃ | n-C₃H₇ | n-C₄H₉ | CH₃ |
| CH₃ | n-C₃H₇ | i-C₄H₉ | CH₃ |
| CH₃ | i-C₃H₇ | n-C₄H₉ | CH₃ |
| CH₃ | i-C₃H₇ | sec.C₄H₉ | CH₃ |
| CH₃ | i-C₃H₇ | n-C₅H₁₁ | CH₃ |
| CH₃ | i-C₃H₇ | C₅H₁₁-3 | CH₃ |
| CH₃ | n-C₄H₉ | n-C₄H₉ | CH₃ |
| CH₃ | n-C₄H₉ | i-C₄H₉ | CH₃ |
| CH₃ | n-C₄H₉ | sec.C₄H₉ | CH₃ |
| CH₃ | n-C₄H₉ | n-C₅H₁₁ | CH₃ |
| CH₃ | i-C₄H₉ | i-C₄H₉ | CH₃ |
| CH₃ | i-C₄H₉ | sec.C₄H₉ | CH₃ |
| CH₃ | i-C₄H₉ | n-C₅H₁₁ | CH₃ |
| CH₃ | sec.C₄H₉ | sec.C₄H₉ | CH₃ |
| CH₃ | sec.C₄H₉ | C₅H₁₁-2 | CH₃ |
| CH₃ | n-C₅H₁₁ | n-C₅H₁₁ | CH₃ |
| CH₃ | n-C₅H₁₁ | C₅H₁₁-2 | CH₃ |
| CH₃ | C₅H₁₁-2 | C₅H₁₁-2 | CH₃ |
| CH₃ | C₅H₁₁-3 | C₅H₁₁-3 | CH₃ |
| CH₃ | C₅H₁₁-2 | C₅H₁₁-3 | CH₃ |
| C₂H₅ | C₂H₅ | n-C₃H₇ | CH₃ |
| C₂H₅ | C₂H₅ | i-C₃H₇ | CH₃ |
| C₂H₅ | C₂H₅ | n-C₄H₉ | CH₃ |
| C₂H₅ | C₂H₅ | i-C₄H₉ | CH₃ |
| C₂H₅ | C₂H₅ | sec.C₄H₉ | CH₃ |
| C₂H₅ | C₂H₅ | n-C₅H₁₁ | CH₃ |
| C₂H₅ | n-C₃H₇ | n-C₃H₇ | CH₃ |
| C₂H₅ | n-C₃H₇ | i-C₃H₇ | CH₃ |
| C₂H₅ | n-C₃H₇ | n-C₄H₉ | CH₃ |
| C₂H₅ | n-C₃H₇ | i-C₄H₉ | CH₃ |
| C₂H₅ | n-C₃H₇ | n-C₅H₁₁ | CH₃ |
| C₂H₅ | n-C₃H₇ | C₅H₁₁-3 | CH₃ |
| n-C₃H₇ | C₂H₅ | C₂H₅ | CH₃ |
| n-C₃H₇ | C₂H₅ | i-C₃H₇ | CH₃ |
| n-C₃H₇ | C₂H₅ | n-C₃H₇ | CH₃ |
| n-C₃H₇ | C₂H₅ | n-C₄H₉ | CH₃ |
| n-C₃H₇ | C₂H₅ | n-C₅H₁₁ | CH₃ |
| n-C₃H₇ | n-C₃H₇ | n-C₃H₇ | CH₃ |
| n-C₃H₇ | i-C₃H₇ | i-C₃H₇ | CH₃ |
| n-C₃H₇ | n-C₃H₇ | i-C₃H₇ | CH₃ |
| n-C₃H₇ | n-C₃H₇ | n-C₄H₉ | CH₃ |
| n-C₃H₇ | n-C₃H₇ | C₅H₁₁-2 | CH₃ |
| n-C₃H₇ | n-C₄H₉ | n-C₄H₉ | CH₃ |
| n-C₃H₇ | i-C₄H₉ | i-C₄H₉ | CH₃ |
| n-C₃H₇ | sec.C₄H₉ | sec.C₄H₉ | CH₃ |
| n-C₃H₇ | n-C₅H₁₁ | n-C₅H₁₁ | CH₃ |
| i-C₃H₇ | C₂H₅ | C₂H₅ | CH₃ |
| i-C₃H₇ | C₂H₅ | i-C₃H₇ | CH₃ |
| i-C₃H₇ | C₂H₅ | n-C₄H₉ | CH₃ |
| i-C₃H₇ | C₂H₅ | i-C₄H₉ | CH₃ |
| i-C₃H₇ | C₂H₅ | C₅H₁₁-3 | CH₃ |
| i-C₃H₇ | n-C₃H₇ | n-C₃H₇ | CH₃ |
| i-C₃H₇ | n-C₃H₇ | i-C₃H₇ | CH₃ |
| i-C₃H₇ | n-C₃H₇ | n-C₄H₉ | CH₃ |
| i-C₃H₇ | n-C₃H₇ | C₅H₁₁-2 | CH₃ |
| i-C₃H₇ | n-C₄H₉ | n-C₄H₉ | CH₃ |
| i-C₃H₇ | n-C₄H₉ | n-C₅H₁₁ | CH₃ |
| i-C₃H₇ | i-C₄H₉ | i-C₄H₉ | CH₃ |
| i-C₃H₇ | i-C₄H₉ | n-C₄H₉ | CH₃ |
| i-C₃H₇ | i-C₄H₉ | n-C₅H₁₁ | CH₃ |
| i-C₃H₇ | n-C₅H₁₁ | n-C₅H₁₁ | CH₃ |
| i-C₃H₇ | C₅H₁₁-2 | C₅H₁₁-2 | CH₃ |

TABLE-continued

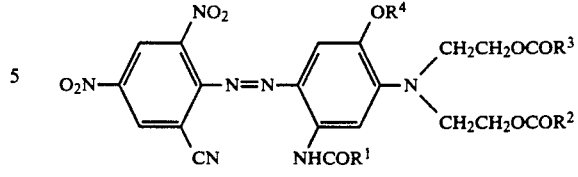

| R¹ | R² | R³ | R⁴ |
|---|---|---|---|
| i-C₃H₇ | C₅H₁₁-3 | C₅H₁₁-3 | CH₃ |
| CH₃ | C₂H₅ | C₂H₅ | C₂H₅ |
| CH₃ | i-C₃H₇ | C₂H₅ | C₂H₅ |
| CH₃ | C₂H₅ | n-C₄H₉ | C₂H₅ |
| CH₃ | n-C₃H₇ | n-C₃H₇ | C₂H₅ |
| CH₃ | n-C₃H₇ | n-C₄H₉ | C₂H₅ |
| CH₃ | n-C₃H₇ | sec.C₄H₉ | C₂H₅ |
| CH₃ | n-C₃H₇ | C₅H₁₁-2 | C₂H₅ |
| CH₃ | i-C₃H₇ | i-C₃H₇ | C₂H₅ |
| CH₃ | i-C₃H₇ | n-C₃H₇ | C₂H₅ |
| CH₃ | i-C₃H₇ | n-C₄H₉ | C₂H₅ |
| CH₃ | i-C₃H₇ | i-C₄H₉ | C₂H₅ |
| CH₃ | i-C₃H₇ | sec.C₄H₉ | C₂H₅ |
| CH₃ | i-C₃H₇ | n-C₅H₁₁ | C₂H₅ |
| C₂H₅ | C₂H₅ | C₂H₅ | C₂H₅ |
| C₂H₅ | C₂H₅ | i-C₃H₇ | C₂H₅ |
| C₂H₅ | C₂H₅ | n-C₄H₉ | C₂H₅ |
| C₂H₅ | C₂H₅ | i-C₄H₉ | C₂H₅ |
| C₂H₅ | C₂H₅ | n-C₅H₁₁ | C₂H₅ |
| C₂H₅ | n-C₃H₇ | n-C₃H₇ | C₂H₅ |
| C₂H₅ | n-C₃H₇ | i-C₃H₇ | C₂H₅ |
| C₂H₅ | n-C₃H₇ | i-C₄H₉ | C₂H₅ |
| C₂H₅ | n-C₃H₇ | sec.C₄H₉ | C₂H₅ |
| C₂H₅ | i-C₃H₇ | i-C₃H₇ | C₂H₅ |
| C₂H₅ | i-C₃H₇ | n-C₄H₉ | C₂H₅ |
| C₂H₅ | i-C₃H₇ | sec.C₄H₉ | C₂H₅ |
| n-C₃H₇ | C₂H₅ | C₂H₅ | C₂H₅ |
| n-C₃H₇ | C₂H₅ | n-C₃H₇ | C₂H₅ |
| n-C₃H₇ | C₂H₅ | i-C₄H₉ | C₂H₅ |
| n-C₃H₇ | n-C₃H₇ | n-C₃H₇ | C₂H₅ |
| n-C₃H₇ | n-C₃H₇ | i-C₃H₇ | C₂H₅ |
| n-C₃H₇ | n-C₃H₇ | sec.C₄H₉ | C₂H₅ |
| n-C₃H₇ | n-C₃H₇ | i-C₃H₇ | C₂H₅ |
| n-C₃H₇ | n-C₃H₇ | n-C₅H₁₁ | C₂H₅ |
| i-C₃H₇ | C₂H₅ | C₂H₅ | C₂H₅ |
| i-C₃H₇ | C₂H₅ | i-C₃H₇ | C₂H₅ |
| i-C₃H₇ | C₂H₅ | n-C₄H₉ | C₂H₅ |
| i-C₃H₇ | i-C₃H₇ | i-C₃H₇ | C₂H₅ |
| i-C₃H₇ | i-C₃H₇ | n-C₃H₇ | C₂H₅ |

What is claimed is:

1. Monoazo dyestuff of the formula

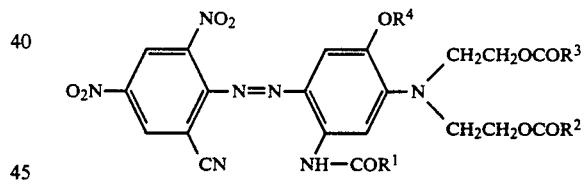

wherein R¹ denotes alkyl having 1 to 3 carbon atoms; R² and R³, independently of one another, each denote alkyl having 2 to 5 carbon atoms; and R⁴ denotes methyl or ethyl.

2. Monoazo dyestuff according to claim 1, wherein R¹ denotes methyl or ethyl.

3. Monoazo dyestuffs according to claim 1, wherein one of R² and R³, independently of one another, is alkyl having 2 to 4 carbon atoms.

4. Monoazo dyestuff according to claim 3, wherein R¹ denotes methyl or ethyl.

5. Monoazo dyestuff according to claim 1, wherein at least one of R² and R³ denote n-propyl, i-propyl, n-butyl, i-butyl or sec.-butyl.

6. Monoazo dyestuff according to claim 1, wherein R¹ denotes ethyl and at least one of R² and R³ denote ethyl.

7. Monoazo dyestuffs according to claim 1, wherein R⁴ denotes methyl.

8. Monoazo dyestuffs according to claim 1, wherein R² and R³ are identical.

9. Monoazo dyestuff according to claim 1, wherein the sum of the carbon atoms in R¹, R² and R³ is 5 to 11.

10. Monoazo dyestuff according to claim 1, wherein the sum of the carbon atoms in R¹, R² and R³ is 6 to 10.

* * * * *